UNITED STATES PATENT OFFICE.

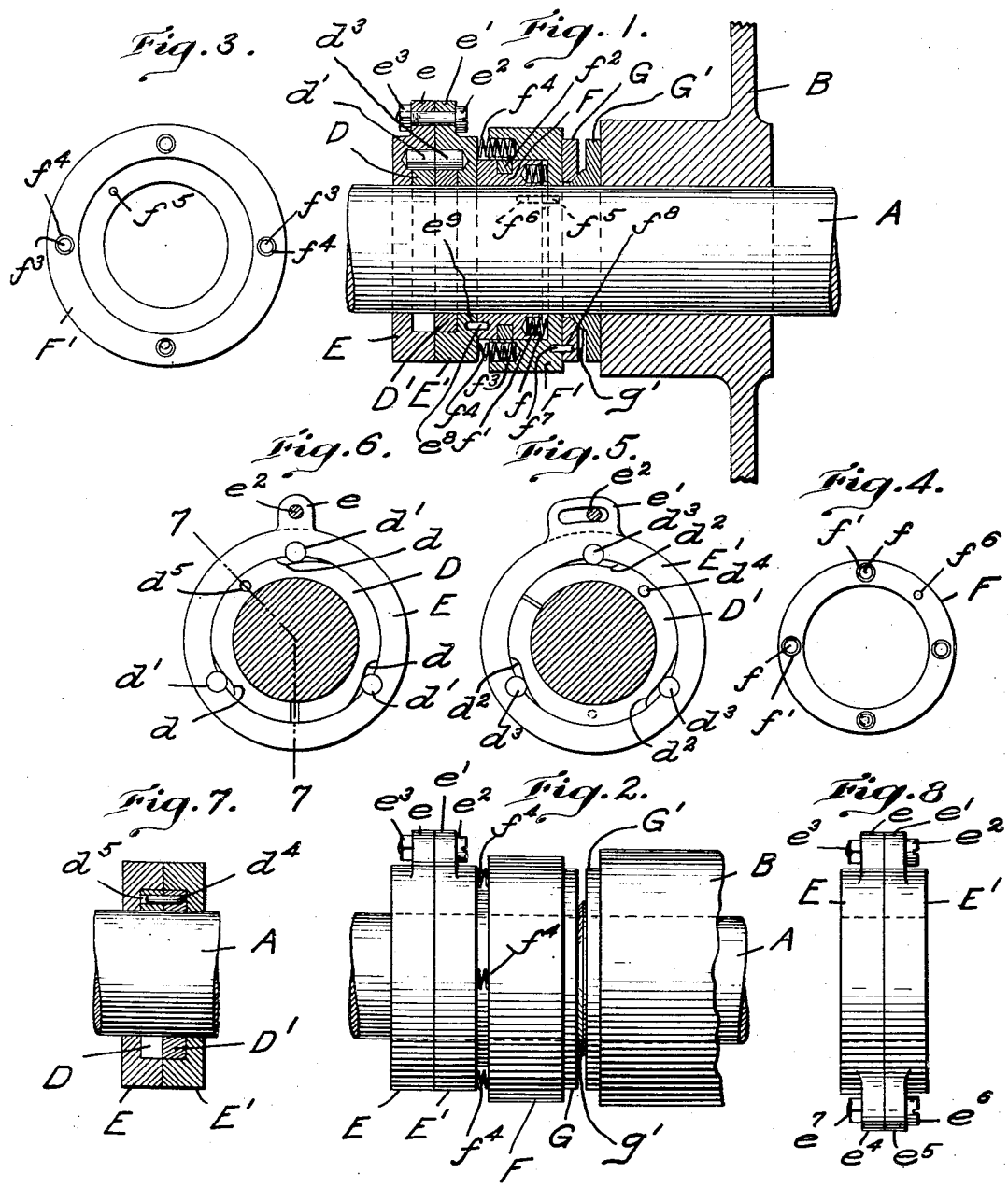

CHARLES F. TEBBETS, OF BOSTON, MASSACHUSETTS, ASSIGNOR TO FRANK RIDLON COMPANY, OF BOSTON, MASSACHUSETTS, A CORPORATION OF MASSACHUSETTS.

FLUID-TIGHT JOINT FOR ROTARY VALVE-STEMS.

1,054,149.  Specification of Letters Patent.  Patented Feb. 25, 1913.

Application filed February 17, 1912. Serial No. 678,260.

*To all whom it may concern:*

Be it known that I, CHARLES F. TEBBETS, of Boston, in the county of Suffolk and State of Massachusetts, have invented a new and useful Fluid-Tight Joint for Rotary Valve-Stems, of which the following is a specification.

My invention relates to making the joints of rotary valve stems and other rotary shafts fluid tight and one object is to entirely do away with set screws or similar devices which injure the stem or shaft.

Another object is to provide an efficient packing for shafts with axial movement and a third object is to provide against leakage in case of tilting of the shaft.

Other objects will be referred to below.

My invention consists partly in a clamp having means within it to hold itself to the stem or shaft, partly in telescoping packing members, partly in relatively tilting packing members and partly in other features pointed out below.

In the drawings Figure 1 is a vertical section of a joint embodying my invention, the shaft being in elevation; Fig. 2 is an elevation of the same; Fig. 3 is an end view of one of the telescoping members looking from the left of Fig. 1; Fig. 4 is an end elevation of the other telescoping member looking in the other direction; Fig. 5 is an end view of one clamping sleeve and ring; Fig. 6 is an end view of the other clamping sleeve and ring; and Fig. 7 is a section on line 7—7 of Fig. 6, and Fig. 8 shows a modification of the sleeves.

Rotary valve stem A is mounted in a suitable bearing B. Mounted on the shaft side by side are split rings D D'. Ring D has three cam surfaces $d$ $d$ $d$ to engage suitable projection $d'$ $d'$ $d'$ on the interior of sleeve E, which projections may be pins or other devices suitably held in place. Sleeve E encircles ring D and is movable with relation thereto, such relative movement in one direction causing the projections to ride up the cam surfaces and compress the ring on the shaft while movement in the other direction releases the ring. Similarly ring D' has cam surfaces $d^2$ $d^2$ $d^2$ engaging projections $d^3$ $d^3$ $d^3$ on sleeve E' but it is to be noted that the cam surfaces of ring D' run in opposite directions to those of ring D. The rings D and D' break joints. Sleeve E has perforated lug $e$ and sleeve E' has slotted lug $e'$, these lugs being bolted together against relative rotary and lateral movement by bolt $e^2$ and nut $e^3$. In Fig. 8 I show the sleeves with additional lugs $e^4$ and $e^5$ and additional bolt $e^6$ and nut $e^7$, these being diametrically opposed lugs $e$ and $e'$ to equalize the locking action and prevent possible twisting and binding. Pin $d^4$ on ring D' engages slot $d^5$ and locks the rings against relative movement.

Bearing against sleeve E' is annular member F, fitting the shaft and having slots $f$ to receive springs $f'$ and having an annular groove to receive packing $f^2$, member F being held against rotation with relation to sleeve E' by pin $e^8$ and socket $e^9$. Encircling member F is annular member F' which telescopes with member F and has slots $f^3$ to receive springs $f^4$ which bear against sleeve E', the inner wall of member F' bearing against springs $f'$, members F and F' being held against relative rotation by pin $f^5$ and socket $f^6$.

Bearing against member F' is an annular packing member G having a seat recess to bear against the beveled lip $g'$ of coöperating packing member G', the latter abutting against bearing B which furnishes a fixed abutment, members G and F' being held against relative rotation by pin $f^7$ and socket $f^8$.

I prefer to grind all the faces of those parts which may have relative movement with relation to the parts against which they bear in order to increase the tightness of the several joints.

In assembling my device packing members, G and G', and telescoping members F and F' are put in proper position with relation to each other and to the abutment bearing B and then sleeves E and E' are clamped to the shaft. In order to effect this clamping pin $d^4$ is put in engagement with slot $d^5$ and then member E is rotated so as to cause its projections to engage the cam surfaces of ring D and clamp the latter to the shaft. Sleeve E' is then rotated in the opposite direction to similarly clamp sleeve D' and then bolt $e^2$ and nut $e^3$ lock the parts in the clamped position. It will be clear, of course, that ring D' might be clamped before ring D.

An important feature of my clamp is that any force tending to move the clamp as a whole in a direction to unclamp one ring will tend all the more to clamp the other ring.

Among the more important advantages of my device are that no set screws or similar devices are used and consequently there is no scarring or grooving of the shaft; that the device is efficient under all working conditions and that it is very simple in construction. Another important advantage is that members E, F, F' and G are so connected to sleeve E' by the pins and sockets that all these parts rotate with the stem or shaft.

What I claim is:

1. A device of the character described comprising a split ring; an operating sleeve encircling the ring and rotatable with relation thereto independently of longitudinal movement with relation thereto to clamp and unclamp the split ring.

2. A device of the character described comprising a split ring; an operating sleeve encircling the ring and rotatable with relation thereto independently of longitudinal movement with relation thereto to clamp the split ring; and means to lock the ring and sleeve in their clamped position.

3. A device of the character described comprising two interlocked and opposed split rings; two operating sleeves, one to clamp each split ring; and means to lock the sleeves together to hold the split rings in their clamped conditions.

4. A device of the character described comprising a split ring adapted to encircle a valve stem; an operating sleeve encircling the ring and movable to clamp it to said stem, the sleeve and ring forming an abutment; a fixed abutment; and a yielding metallic packing between and bearing against said abutments.

5. A device of the character described comprising a fixed abutment; an abutment adapted to be fixed to a movable stem; two telescoping members, one forming a closure against one abutment and the other a closure against the other abutment; and means for yieldingly holding said members apart.

6. A device of the character described comprising a fixed abutment; an abutment adapted to be fixed to a movable stem; two telescoping members, one forming a closure against one abutment and the other a closure against the other abutment and one of said members being made with an annular groove; a packing in said groove; and means for yieldingly holding said members apart.

7. A device of the character described comprising a fixed abutment; an abutment adapted to be fixed to a movable stem; two packing members interposed between said abutments, one being made with an annular seat recess and the other with an annular beveled lip to seat in said recess.

8. A device of the character described comprising a fixed abutment; an abutment adapted to be fixed to a movable stem; two telescoping members, one forming a closure against the second-mentioned abutment; means for yieldingly holding said members apart; and two supplemental packing members between the telescoping members and the first-mentioned abutment, one of said packing members being made with an annular seat recess and the other with an annular beveled lip to seat in said recess.

9. A device of the character described comprising two interlocked and opposed split rings; two operating sleeves, one to clamp each split ring, one ring and its sleeve forming an abutment; means to lock the sleeves together to hold the split rings together in their clamped positions; two telescoping members, one forming a closure against said abutment; means for yieldingly holding said members apart; a fixed abutment; and two packing members interposed between the telescoping members and the fixed abutment, one of said packing members having an annular seat recess and the other having an annular beveled lip to seat in said recess.

10. A device of the character described comprising a split ring having a cam on its outer surface, a sleeve encircling the ring and rotatable with relation thereto and having a projection to engage the cam and thereby clamp the ring.

11. A device of the character described comprising two split rings locked against relative rotary movement and each having a cam on its outer surface; two sleeves one encircling one ring and having an internal projection and being movable in one direction with relation to its ring to cause the projection to engage the cam and thereby clamp said ring, and the other encircling the other ring and having an internal projection and being movable in the opposite direction with relation to its ring to cause its projection to engage the cam of its ring and thereby clamp its ring; and means to lock the two sleeves together.

12. A device of the character described comprising two interlocked and opposed split rings; two operating sleeves, one to clamp each split ring; and means to lock the sleeves together at diametrically opposite points.

13. A device of the character described comprising a member adapted to be clamped to a shaft; a yielding metallic packing to encircle said shaft and held against rotation relatively to said member; a packing member encircling said shaft and held against rotation relatively to said yielding packing and having an annular seat recess; and a second packing member with an annular beveled lip to seat in said recess.

14. A device of the character described comprising a split ring; an operating sleeve encircling the ring and rotatable with relation thereto to clamp the split ring; and means adapted for rigid connection to the valve stem to lock the ring and sleeve in their clamped position.

15. A device of the character described comprising two interlocked and opposed split rings; two operating sleeves, one rotatable to clamp one split ring and the other rotatable to clamp the other split ring; and means to hold the split rings in their clamped conditions.

16. A device of the character described comprising two opposed split rings; and two operating sleeves, one rotatable to clamp one ring and the other rotatable to clamp the other ring.

17. A device of the character described comprising a split ring adapted to encircle a valve stem; an operating sleeve encircling the ring and rotatable to clamp it to said stem, the sleeve and ring forming an abutment; a fixed abutment; and a yielding metallic packing between and bearing against said abutments.

18. A device of the character described comprising a fixed abutment; an abutment adapted to be fixed to a movable stem; two telescoping members between said abutments; and means for yieldingly holding said members apart.

19. A device of the character described comprising a fixed abutment; an abutment adapted to be fixed to a movable stem; means including two telescoping members for packing the stem between said abutments; and means for yieldingly holding said members apart.

20. A device of the character described comprising a fixed abutment; an abutment adapted to be fixed to a movable stem; two telescoping members between said abutments, one of said members having an annular groove adjacent to the other member; a packing in said groove; and means for yieldingly holding said members apart.

21. A device of the character described comprising a metallic split ring having its outer wall extending in its lengthwise direction parallel to the axis of the valve stem; and an operating sleeve whose inner wall extends in its lengthwise direction parallel to said axis, said sleeve encircling the ring and rotatable with relation thereto said walls by their direct engagement clamping the split ring.

CHARLES F. TEBBETS.

Witnesses:
FRANKLIN P. DALEY,
G. C. ROCKWELL.